United States Patent Office 3,150,088
Patented Sept. 22, 1964

3,150,088
HIGHLY BASIC CALCIUM-CONTAINING
ADDITIVE AGENT
Mack W. Hunt, Gerald L. Nield, and Richard M. Tillman, Ponca City, Okla., assignors to Continental Oil Company, Ponca City, Okla., a corporation of Delaware
Filed Mar. 23, 1962, Ser. No. 181,930
26 Claims. (Cl. 252—32.7)

This invention relates to highly basic calcium-containing additive agents. More particularly, it relates to a process for dispersing a calcium-containing inorganic compound, which is calcium hydroxide, calcium carbonate, or mixtures thereof, in a nonvolatile carrier. Another aspect of the invention relates to a process for preparing a calcium alkoxide-carbonate complex, said complex being used in the preparation of the dispersion of the calcium-containing inorganic compound. Still another aspect of the invention relates to the calcium alkoxide-carbonate complex itself.

The present application in a continuation-in-part of application Serial No. 15,032, filed March 31, 1960, which in turn was a continuation-in-part of application Serial No. 812,288, filed May 11, 1959, both of which are now abandoned.

In heavy-duty, detergent-type lubricating oil compositions for use in diesel and other internal combustion engines, at least two requirements must be met by such oils (in addition to lubricity, stability, and the like) if a high degree of engine cleanliness is to be maintained. First, the oil must possess the ability to disperse insolubles formed by fuel combustion and/or oil oxidation. Secondly, the oil must be capable of neutralizing both the acidic combustion products and acidic lacquer precursors.

It is particularly desirable that lubricating oil compositions used in marine diesel engines have a high degree of basicity. This requirement is caused by the use of fuels having a high sulfur content, which, in turn, means a larger amount of acidic combustion products. Of course, it is possible to alleviate this problem through the use of lower sulfur fuels. However, the economics of the situation makes it desirable to use a high sulfur fuel in conjunction with a lubricating composition capable of neutralizing the acidic combustion products.

The compositions of the present invention are generally useful in lubricating compositions for use in internal combustion engines. They are also useful in corrosion inhibiting compositions. Since they are capable of containing a large amount of excess basicity, they are especially useful in marine lubricating compositions.

Many attempts have been made heretofore to produce substances which possesses an alkaline reserve whereby the acidic materials formed in lubricating oils during use may be neutralized. One proposed method is that described by Bergstrom in U.S. Patent Nos. 2,271,577 and 2,279,086 utilizing basic soaps. These basic soaps demonstrated a certain superiority, and further attempts were made to increase the basicity of such soaps. One of the earliest patents referring to these basic soaps, or as they were sometimes called overbased soaps or metal complexes, is that of the McNab U.S. Patent No. 2,418,894. Other workers in this field include Griesinger et al., U.S. Patent No. 2,402,325. These patentees suggested the use of a neutralizing agent up to about 220 percent of the theoretical amount required for the complete neutralization of the acid from which the soap was made. The work of Griesinger et al. was followed by Campbell and Dellinger, as described in their U.S. Patent No. 2,485,861. These particular patentees base their disclosure on the hypothesis that minor amounts of alkaline earth metal hydroxide or carbonate can be peptized by means of an oil mahogany sulfonate. Mertes' U.S. Patent No. 2,501,731 describes a process whereby the normal soap is first formed and then an additional base combined therewith by a more-or-less simple mixing and heating operation followed by filtration. Utilizing the basic disclosure of Mertes, Asseff et al. in their U.S. Patent 2,616,924 disclose a process whereby a much larger amount of metal or base may be combined with the normal soap, thus forming a complex which may be dispersed in a lubricating oil and, because of the excess metal present, possesses an alkaline reserve. The invention of Asseff et al. is an improvement over the Mertes disclosure in that Asseff et al. employed a so-called promoter. Generally, these promoters are alkylated phenols. Still another disadvantage, as compared to our invention, is that, as a general rule, the products prepared in the processes of the prior art do not contain the degree of excess basicity as may be incorporated in our product.

Carlyle's U.S. Patent 2,861,951 discloses a process whereby barium carbonate is dispersed in a nonvolatile carrier. By the method disclosed by Carlyle, the inorganic material is dispersed in the nonvolatile carrier in particles that are considerably smaller than 5 microns in diameter. Also, by this method, it is unnecessary to form a complex involving a heating process. Neither is it necessary to subject the product to a filtration step. One disadvantage of the process taught by Carlyle is the inherent cost of barium compounds. As is well known to those skilled in the art, barium compounds are relatively expensive. Another disadvantage inherent in the use of barium compounds is due to the difference in atomic weights of barium and calcium. In order to obtain the same number of chemical equivalents, it is necessary to use about 3.4 times the amount of barium, on a weight basis, as of calcium.

U.S. Patent No. 2,920,105 to Kluge et al. discloses a process for making oil-soluble hyperbasic alkaline earth metal sulfonates. The process of these patentees comprises forming a reaction mixture of an oil-soluble normal alkaline earth metal sulfonate in a water-immiscible organic medium and an alkaline earthe metal lower alkoxy ethanolate in a vehicle of the corresponding alkoxy ethanol, the mole ratio of said alkoxy ethanolate to normal sulfonate being between about 0.5:1 and about 7:1 or even higher, said normal sulfonate starting material containing not substantially more than about the stoichiometric amount of liquid water needed to complete hydrolysis of the alkoxy ethanolate starting material into the corresponding alkaline earth metal hydroxide, stripping the mixture at temperatures of 225° and 450° F, bringing the total quantity of water introduced into the reaction mixture to an amount sufficient for obtaining complete liberation of the combined alkoxy ethanol from the alkoxy ethanolate starting material, and terminating the stripping when substantially all of the alkoxy ethanol, vehicle and hydrolysis reaction product, has been expelled from the reaction mixture.

U.S. Patent 2,937,991 to Robert L. Carlyle, discloses a method for preparing a dispersion of calcium carbonate, in particles the diameter of which are less than 0.25 micron, in a nonvolatile carrier. This process uses an aliphatic alcohol solution of an oil-insoluble calcium-containing base formed by the reaction between hydrogen sulfide and either calcium oxide or calcium hydroxide.

Also, U.S. Patent 2,956,018 to Carlyle et al., discloses a method for preparing a dispersion of a basic metal-containing compound, wherein the cation is Na, Ba, or Ca, in oleaginous compositions. This process uses an oil-insoluble complex formed by passing carbon dioxide through an alcohol-inorganic compound mixture (cation=Na, Ba, or Ca).

While the processes of Patent Nos. 2,920,105, 2,937,-991, and 2,956,018 are improved processes, as compared with other known processes, the process of the present invention has further advantages. This will be apparent from a later discussion.

It is, therefore, a principal object of the present invention to provide a process for preparing a stable dispersion of a calcium-containing inorganic compound in a nonvolatile carrier, which process obviates the disadvantages of the prior art processes. Another object of the present invention is to provide a highly useful oil composition utilizing such dispersions. Still another object of the present invention is to provide a process for preparing a calcium alkoxide-carbonate complex which can be used in preparing a stable dispersion of a calcium-containing inorganic compound in a nonvolatile carrier. Yet another object of the present invention is to provide, as a composition of matter, a calcium alkoxide-carbonate complex. These and other objects and advantages of the invention will be apparent as the description proceeds.

Broadly stated, one aspect of the present invention relates to a calcium alkoxide-carbonate complex having the following formula:

where R is either a $C_1$ to $C_6$ alkyl group or an organic radical of the formula:

wherein R' is a $C_1$ to $C_4$ alkyl group and $x$ is from 0.5 to 1.5, preferably from 0.85 to 1.15. This complex is particularly useful for preparing a stable dispersion of a basic, calcium-containing, inorganic compound in a nonvolatile carrier.

Another aspect of the present invention relates to a process for preparing an oil-soluble calcium alkoxide-carbonate complex. Broadly stated, the process comprises:

(a) Reacting a suitable alcohol with a calcium compound, characterized as producing a gas as a by-product on reaction with the alcohol, to form a calcium alkoxide, (b) Reacting the calcium alkoxide with carbon dioxide to form a calcium alkoxide-carbonate complex.

Still another aspect of the present invention relates to a process for preparing a stable dispersion of a basic, calcium-containing inorganic compound in a nonvolatile carrier wherein the process comprises:

(a) Admixing an alcoholic solution of an oil-soluble calcium alkoxide-carbonate complex, said complex having been prepared from a calcium compound which produces a gas as a by-product on reaction with an alcohol, an oil-soluble dispersing agent, a nonvolatile carrier, and water in an amount which is a stoichiometric excess of that required to react with the calcium alkoxide-carbonate complex, (b) Hydrolyzing the calcium alkoxide-carbonate complex to an oil-insoluble calcium-containing inorganic compound, and then (c) Removing the volatile materials.

A particularly important feature of this aspect of the present invention is that the oil-insoluble, calcium-containing compound is in the form of particles having diameters of less than 0.25 micron.

Having broadly stated our invention, it is now convenient to discuss the advantages of the present invention as compared to the Carlyle, Carlyle et al., and Kluge et al. patents. An important advantage of our process is that our process uses a calcium compound which, on reaction with an alcohol, produces a gas as a by-product. For example, the reaction of an alcohol with calcium metal, calcium hydride, or calcium carbide produces a gas in each case. By contrast, the Carlyle and Carlyle et al. patents use calcium oxide or calcium hydroxide, which, on reaction with an alcohol, produce water as a by-product. The reactions involved are equilibrium reactions. Since water is formed in the reaction when either calcium oxide or calcium hydroxide is employed, it is apparent that it would be difficult to drive the reaction to completion. However, it is readily apparent that the reactions in which a gas is formed are readily driven to completion by the expulsion of the gas.

When calcium carbide is used as the calcium compound, another significant advantage exists. The reaction of calcium carbide with an alcohol produces acetylene as a by-product, the acetylene itself being of considerable value. In fact, in a plant of moderate size, the acetylene may be recovered and the value of the acetylene recovered equals, or slightly exceeds, the cost of the calcium carbide used in producing it.

Still another advantage of the present invention is that dispersions having very high base numbers, in other words a very high degree of excess basicity, are obtained. We believe that these high base number dispersions are obtained because of the particular intermediate used in our invention. In turn, this intermediate is prepared from novel materials by a novel process which, in themselves, may be responsible for the high basicity present in our dispersions.

Before proceeding with specific examples which illustrate our invention, it may be well to indicate, in general, the nature of the materials used, the more important operating conditions in the process, and the nature of the intermediate (calcium alkoxide-carbonate complex).

*Materials used.*—The calcium compounds of our process are those which form a gas on reaction of the compound with a suitable alcohol. Suitable calcium compounds are calcium metal, calcium hydride, and calcium carbide. Of these, calcium carbide is preferred for economic reasons.

The calcium carbide which can be used in our process can be either a chemically pure compound or the technical grade. Generally, we prefer to use the technical grade, since it is readily available and economical. However, we wish to point out that when the technical grade is used, it is necessary to filter, settle, or centrifuge the intermediate calcium alkoxide carbonate to remove impurities, such as carbon and lime, that are present in the calcium carbide.

Suitable alcohols for use in our process are those which are reactive with the calcium compound and which dissolve the calcium alkoxide-carbonate complex formed in the process. This requirement has limited suitable alcohols to those generally classified as branched-chain primary alcohols, the monoether alcohols of ethylene glycol, the monoether alcohols of diethylene glycol, and the halogen-containing primary alcohols. The term "alcohol," as used herein, refers to compounds having the formula ROH, where R must contain carbon and hydrogen and may contain oxygen or halogen. While any of these alcohols are suitable, generally we prefer not to use those containing above about 8 carbon atoms, since such alcohols have a high boiling point and require more heat for their removal. Specific examples of suitable alcohols include isobutanol, isopentanol, 2-ethyl butanol, 2-ethyl hexanol, monomethyl ether of ethylene glycol, monoethyl ether of ethylene glycol, monobutyl ether of ethylene glycol, monophenyl ether of ethylene glycol, monomethyl ether of diethylene glycol, monoethyl ether of diethylene glycol, 2-chloroethanol, 2-chlorobutanol, 2-bromopentanol, 2,2,3,3-tetrafluoropropanol, furfuryl alcohol, and tetrahydrafurfuryl alcohol.

The monoethers of ethylene glycol are also known as alkoxy ethanols. These materials have the generic formula $ROCH_2CH_2OH$ where R is a $C_1$ to $C_6$ hydrocarbon group. The materials are available commercially under the trademarks Cellosolve, methyl Cellosolve, and butyl Cellosolve. For reason of simplicity, in this application, we prefer the term "alkoxy ethanol."

The monoalkyl ether of diethylene glycol has the generic formula $HOCH_2CH_2OCH_2CH_2OR$, where R is a $C_1$ to $C_4$ alkyl group. These materials are available commercially under the trademark Carbitol.

The alkoxy ethanols (e.g., 2-ethoxyethanol and 2-methoxyethanol) are preferred in our process, since they react readily with the calcium compound and also dissolve the calcium alkoxide-carbonate complex. In much of the discussion herein, the term "methoxy ethanol" is used. This refers to 2-methoxy ethanol and is used for illustrative purposes only. Also, elsewhere in this discussion the term "monoether alcohols" is used. This refers to either monoether alcohols of ethylene glycol or monoether alcohols of diethylene glycol.

A wide variety of nonvolatile carriers may be used in our process. The principal requisite desired in the nonvolatile carrier is that it will act as a solvent for the dispersing agents used in the process. Examples of nonvolatile carriers which may be used include mineral lubricating oil obtained by any of the conventional refining procedures; vegetable oils, such as corn oil, cottonseed oil, castor oil, etc.; animal oils, such as lard oil, sperm oil, etc.; and synthetic oils, such as polymers of propylene, polyoxyalkylenes, polyoxypropylene, dicarboxylic acid esters, such as esters of adipic and azelaic acids with alcohols, such as butyl, 2-ethylhexyl, and dodecyl alcohols, and esters of acids of phosphorus, such as diethyl esters of decane-phosphonic acid and tricresyl phosphate. If desired, the nonvolatile carriers may be diluted with a solvent to reduce the viscosity. Suitable solvents include petroleum naphtha or hydrocarbons, such as hexane, heptane, octane, benzene, toluene or xylene.

A variety of oil-soluble dispersing agents may be used. Generic examples of suitable dispersing agents include the oil-soluble sulfonic acids, carboxylic acids, phosphorus sulfide-treated olefins, and metal salts thereof. Preferred dispersing agents include the oil-soluble sulfonic acids, carboxylic acids, and metal salts thereof.

Sulfonates which are suitable are oil-soluble and include alkyl sulfonates, alkaryl sulfonates, the so-called mahogany or natural soaps, and the like. The mahogany soaps include, particularly, the oil-soluble aromatic sulfonates from petroleum. Many of the aromatic sulfonates have cycloalkyl (i.e., naphthenic) groups in the side chains attached to the benzene ring. The mahogany soaps may include nonaromatic sulfonates produced in conventional sulfuric acid refining of lubricating oil distillates and from the industrial use of fuming sulfuric acid in the refining of petroleum. The industrial production of oil-soluble mahogany sulfonates from petroleum is well understood in the art and is described in the literature. Normally, the alkyl sulfonates require about 24 carbon atoms for oil solubility. The alkaryl sulfonates, however, require an alkyl portion totaling only about 18 carbon atoms. To attain the requisite oil solubility, therefore, requires that the hydrocarbon portion of the sulfonate have a molecular weight between about 350 and 1,000. Preferably, this molecular weight is between 400 and 700. Particularly useful sulfonates include diwaxbenzene sulfonates, diwaxtoluene sulfonates, and postdodecylbenzene sulfonates. Postdodecylbenzene, which consists of monoalkylbenzenes and dialkylbenzenes in the approximate mole ratio of 2 to 3, has typical properties as follows:

| | |
|---|---|
| Specific gravity at 38° C. | 0.8649 |
| Average molecular weight | 385 |
| Percent sulfonatable | 88 |
| A.S.T.M. D-158 Engler: | |
| I.B.P. °F | 647 |
| 5 °F | 682 |
| 50 °F | 715 |
| 90 °F | 760 |
| 95 °F | 775 |
| F.B.P. °F | 779 |
| Refractive index at 23° C. | 1.4900 |
| Viscosity at: | |
| −10° C. centipoises | 2800 |
| 20 do | 280 |
| 40 do | 78 |
| 80 do | 18 |
| Aniline point °C | 69 |
| Pour point °F | −25 |

The wax used in making the wax aromatic sulfonate is obtained from different sources of crude petroleum oil. Various grades of paraffin wax are made with different melting points. The 126–128° F. (52.2–53.3° C.) melting point wax is a mixture of organic compounds with the molecular weight averaging in the range of 330–340. The average number of carbon atoms in this mixture of organic compounds will be around 24. As the melting point of the wax decreases, the carbon content of the mixture will average as low as 18 or a little lower.

Other sulfonates which may be used in the process of this invention include, for example, mono- and poly-wax substiuted naphthalene sulfonates, dinonyl naphthalene sulfonates, diphenyl ether sulfonates, naphthalene disulfide sulfonates, diphenyl amine sulfonates, dicetyl thianthrene sulfonates, dilauryl betanaphthol sulfonates, dicapryl nitro-naphthalene sulfonates, unsaturated paraffin wax sulfonates, hydroxy substituted paraffin wax sulfonates, tetra-amylene sulfonates, mono- and poly-chloro-substituted paraffin wax sulfonates, nitrosoparaffin wax sulfonates; cyclo-aliphatic sulfonates, such as lauryl-cyclohexyl sulfonates, mono- and polywax substituted cyclohexyl sulfonates, and the like. The expression "petroleum sulfonate" is intended to cover all sulfonates derived from petroleum products.

Instead of using the foregoing sulfonates as such in the invention, we may also form those sulfonates in situ by adding the corresponding sulfonic acid to the mixture which then can be converted to the sulfonate by any convenient means.

Suitable carboxylic acids include naphthenic acids such as the substituted cyclopentane monocarboxylic acids, the substituted cyclohexane monocarboxylic acids and the substituted aliphatic polycyclic monocarboxylic acids containing at least 15 carbon atoms. Specific examples include cetyl cyclohexane carboxylic acids, dioctyl cyclopentane carboxylic acids, dilauryl decahydronaphthalene and stearyl-octohydro indene carboxylic acids and the like and oil-soluble salts thereof. Suitable oil-soluble fatty acids are those containing at least 8 carbon atoms. For producing the object of this invention in liquid form we prefer fatty acids which are liquids at ambient temperatures down to about 15° C. Specific examples include 2-ethyl hexanoic acid, pelargonic acid, oleic acid, palmitoleic acid, linoleic acid and ricinoleic acid. Naturally occuring mixtures of predominately unsaturated fatty acids, such as tall oil fatty acids, are particularly suitable.

Similarly, as in the case of sulfonates, instead of using the foregoing carboxylic acid soap as such, we may form those soaps in situ by adding the corresponding carboxylic acid to the mixture.

The phosphorus sulfide treated olefins (by the term "olefins" we mean to include, also olefin polymers, e.g., polyisobutylene) and their oil-soluble metal salts which are suitable for use include those customarily used in lubricating oil formulations as corrosion inhibitors and/or detergents. Specifically, they include the potassium-polyisobutylene-phosphorus sulfide products described by U.S. Patent 2,316,080, issued on April 6, 1943, to Loane and Gaynor, and a similar material containing no metal made by addition of a phosphorus sulfide to wax olefins, as described in U.S. Patent 2,516,119, issued on July 25, 1950, to Hersh. This latter preferred material is made by first forming wax olefins from paraffin waxes by halogenation and dehydrohalogenation and subsequently treating the olefins with a phosphorus sulfide, preferably phosphorus pentasulfide. Another teaching of the preparation of phosphorus sulfide treated olefins is U.S. Patent 2,688,612, issued September 7, 1954, to Watson.

*Process conditions.*—The process conditions used in the preparation of the calcium alkoxide-carbonate complex will now be discussed. The reactions involved in this step can be shown as follows, using calcium carbide as the calcium compound for illustrative purposes.

(1) $\quad CaC_2 + 2ROH \longrightarrow Ca(OR)_2 + HC\equiv CH\uparrow$ (2) $\quad Ca(OR)_2 + CO_2 \longrightarrow RO-Ca-O-\overset{O}{\underset{\|}{C}}-OR$ The product of reaction 1 has only limited solubility in the starting alcohol. The product of reaction 2, on the other hand, is quite soluble in the starting alcohol.

In our discussion of suitable alcohols we have stated that, in order to be suitable for our process, the alcohols must (1) be reactive with a calcium compound and (2) act as a solvent for the calcium alkoxide-carbonate complex. Methoxy ethanol reacts readily with calcium carbide and dissolves the calcium alkoxide-carbonate complex. Isobutanol, however, reacts very slowly with calcium carbide. Methanol reacts readily with calcium carbide, but does not possess the requisite solubility. We have found that the disadvantages of methanol and isobutanol may be overcome by reacting calcium carbide first with methanol. After reacting the calcium carbide first with methanol, the calcium methoxide is easily transesterified to calcium isobutoxide by heating the mixture in the presence of excess isobutanol and distilling off the methanol. The calcium isobutoxide is then carbonated to the desired alkoxide-carbonate by treatment with $CO_2$ gas. In such a preparation, it is necessary to include a catalyst to promote the carbonation reaction. Strictly speaking, this catalyst is not needed in the initial stages of reaction with methanol or transesterification with isobutanol. The efficacy of the catalyst, however, is for some unknown reason much greater if added initially. Suitable catalysts are acidic in nature. Specific catalysts include benzoyl peroxide, tertiarybutylhydroperoxide, phosphorus trichloride, toluene sulfonic acid, postdodecylbenzene sulfonic acid (derived from postdodecylbenzene which consists of mono- and dialkylbenzenes), sulfuric acid, and calcium chloride. While we believe it to be implied from the preceding discussion, we would like to note that these catalysts are not needed when either the monoether alcohols of ethylene glycol or the monoether alcohols of diethylene glycol are employed in the process.

The amount of alcohol used in forming the calcium alkoxide and as a solvent can be varied over wide limits. It should, however, be in excess of that required to react with the calcium carbide. Stated another way, we prefer to use an amount of alcohol which is sufficient to dissolve the calcium alkoxide-carbonate complex and to yield a solution having a calcium content falling in the range of from about 7 to about 10 percent. Satisfactory results can be obtained when the calcium content varies within the range of about 1 to about 15 percent.

The time required for conducting the reaction of the calcium carbide and the alcohol is governed by the reaction temperature and the surface area of the calcium carbide. In conducting the reaction we prefer to bring the solvent (alcohol) up to a point where a vigorous reaction commences. We then discontinue heating and allow the reaction to level out as determined by the heat of reaction. When using methoxy ethanol, a suitable temperature range has been found to be 160–257° F., with a more suitable temperature range being 200–230° F. When using methanol, a suitable temperature range is 100–147° F., with a more suitable range being 120–135° F.

While we normally conduct this reaction at atmospheric pressure, it is to be understood that deviations from atmospheric pressure are permissible. In general, it is more convenient to operate at a slight positive pressure than at a slight negative pressure. Since acetylene is a by-product, as a safety precaution, the maximum desirable pressure is 13.8 p.s.i.g., as the detonation range for acetylene begins here.

It should be noted that time, temperature, and pressure conditions are not critical in our process, with the exception of pressure for reasons of safety. The determination of these operating conditions is considered to be within the knowledge of those skilled in the art.

In the preparation of the calcium isobutylcarbonate complex, the amount of carbon dioxide used can be varied over a wide range. In general, we have found that mole ratios of carbon dioxide to calcium of 1.5 or greater have been satisfactory. In the preparation of the calcium monoether alkoxide-carbonate complex, we have found that the degree of carbonation affects the solubility of the complex in the alcohol. In general, we have found a mole ratio of carbon dioxide to calcium in the range of about 0.50 to about 1.50 to be suitable, and a range of about 0.85 to about 1.15 to be preferable.

The alcohol solution of calcium alkoxide-carbonate complex is filtered to remove any impurities contained in the calcium carbide. While this filtration could be done on the final product, it is preferable to do it at this point because of the increased ease of filtration. In addition, filtration at this point eliminates the necessity of any filtration or centrifugation to the final product.

The amount of the different components used in the preparation of the final product in our process can be varied widely. As an example, the oil-soluble dispersing agent may vary from about 20 to about 55 percent of the total composition, the nonvolatile carrier may vary from about 34 to about 77 percent, and the amount of the calcium-containing inorganic compound may vary from about 4 to about 35 percent. The latter could probably be stated more accurately as to calcium content. In this case, the amount of calcium as calcium carbonate in the final composition may vary from about 1.78 to 14.30 percent. All percentage figures given above are by weight.

In producing the dispersion of calcium-containing inorganic compound in calcium sulfonate-nonvolatile carrier blend, utilizing the oil-soluble, calcium-containing complex the following general procedure is used. To a nonvolatile carrier or a nonvolatile carrier-hydrocarbon solvent solution of an oil-soluble dispersing agent is added an amount of water calculated to completely decompose the calcium alkoxide-carbonate complex.

Using the calcium alkoxide-carbonate complex derived from methoxy ethanol for purposes of illustration, we have shown previously that this material has the following formula:

$$Ca(OCH_2CH_2OCH_3)_{2-x}(O-\overset{O}{\underset{\|}{C}}-OCH_2CH_2OCH_3)_x$$

where $x$ is from 0.5 to 1.5, preferably from 0.85 to 1.15.

The stoichiometry of the hydrolysis reaction is dependent on the degree of carbonation of the complex, in other words the value of $x$ in the preceding formula. When $x$ is in the range of 0.5 to 1.0, the hydrolysis reaction can be represented as follows:

$$Ca(OCH_2CH_2OCH_3)_{2-x}(O-\overset{O}{\underset{\|}{C}}-OCH_2CH_2OCH_3)_x + {}_{2-x}H_2O \longrightarrow$$
$$2ROH + {}_{1-x}Ca(OH)_2 + {}_xCaCO_3$$

When $x$ is in the range of 1.0 to 1.5, the hydrolysis reaction can be represented as follows:

$$Ca(OCH_2CH_2OCH_3)_{2-x}(O-\overset{O}{\underset{\|}{C}}-OCH_2CH_2OCH_3)_x + H_2O \longrightarrow$$
$$2ROH + CaCO_3 + {}_{x-1}CO$$

We have found that a stoichiometric excess of water must be present at all times in order to prevent the formation of nondispersed solids. In addition, the presence of an excess of water insures the complete recovery of the alcohol. Stated on a molar basis, the amount of water to be used is as follows: A suitable range of water is from 1.1 moles to 7.0 moles per mole of complex, provided that the additional requirement of having a stoichiometric excess is met. A more suitable range of water is from 1.55 moles to 4.0 moles per mole of complex. A preferable range of water is from 1.6 to 2.4 moles per mole of complex.

While this mixture is agitated, an amount of calcium alkoxide-carbonate solution, calculated to give the desired degree of overbasing, is added. This addition preferably is made slowly. Following this addition, the volatile solvents are removed by distillation. During the latter stages of the distillation, it is often desirable to employ gas blowing to facilitate solvent removal. Preferably, carbon dioxide is used for this gas blowing. The removal of the volatile solvents leaves a bright, fluid product which requires no additional filtration or centrifugation.

We have stated previously that a stoichiometric excess of water must be present at all times in the hydrolysis step. This is true in both a batch and continuous process. We do not mean that all of the water must be added to the reaction vessel prior to the addition of the calcium alkoxide-carbonate complex. What is meant is that, in adding the water and calcium alkoxide-carbonate complex to the reaction vessel, there must always be a stoichiometric excess of water in the reaction vessel. Otherwise, nondispersed solids are encountered. Preferably, a small amount of water (10–25 percent of the total amount to be added) is added to the reaction vessel prior to the addition of any complex and the remaining water and the complex are added concurrently.

We have found it advantageous, particularly on a commercial operation, to employ an azeotrope of the monoether alcohol and water in place of water alone for the hydrolysis of the intermediate. This is because the monoether alcohols form azeotropes with water and are difficult to recover from the azeotrope.

The relative amounts of the different components employed in the process are dependent upon the desired percent actives and the base numbers of the final compositions. (The term "percent active" refers to the amount of dispersing agent present in the composition.) These variations are tabulated below for typical sulfonate preparations:

TABLE I

|  | 20% active 50 B.N. | 30% active 400 B.N. | 55% active 50 B.N. |
|---|---|---|---|
| Percent Ca sulfonate | 20.00 | 30.00 | 55.00 |
| Percent Ca CO$_3$ | 4.46 | 35.70 | 4.46 |
| Percent oil | 75.54 | 34.30 | 40.54 |
| Percent sulfonic acid | 19.10 | 28.60 | 52.50 |
| Percent Ca as sulfonate | 0.90 | 1.40 | 2.50 |
| Percent Ca as Ca CO$_3$ | 1.78 | 14.30 | 1.78 |
| Percent total Ca | 2.68 | 15.70 | 4.28 |

Figure 1:
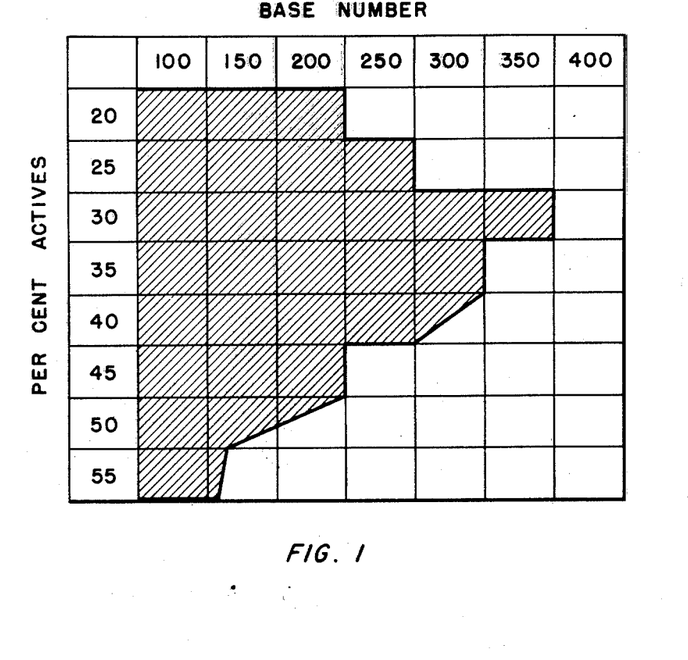

We have found that there is a relationship between the base numbers, the percent actives, and the viscosity of the final product. This is illusrated in FIGURE 1, wherein the hatched area illustrates compositions which are suitable from a viscosity standpoint. Compositions falling outside the hatched area are very viscous and are difficult to handle at room temperature.

*The intermediate.*—The terms, "calcium alkoxide-carbonate complex" and "calcium intermediate" are used synonymously herein. As far as is known, the calcium alkoxide-carbonate complexes derived from monoether alcohols have not been prepared heretofore and they are, therefore, considered to be new compositons of matter.

The calcium intermediate correspond to the following general formula:

where R is either a $C_1$ to $C_6$ alkyl group or a monoether of the formula:

wherein R' is a $C_1$ to $C_4$ alkyl group and $x$ is from 0.5 to 1.5, preferably from 0.85 to 1.15.

The calcium intermediates are soluble in the monoether alcohol from which they are derived. In addition, the calcium intermediates have a solubility in other hydrocarbon solvents corresponding to that of the alcohol from which they are derived. For example, the calcium intermediate prepared with methoxy ethanol has a solubility in benzene and hexane corresponding to that of methoxy ethanol in the solvents. Elsewhere herein we have used the term "oil-soluble" as applied to these intermediates. This term should be clarified somewhat. The calcium intermediates of this invention (and this includes those of all suitable alcohols listed herein) have an appreciable solubility in hydrocarbon solvents, both aromatic and non-aromatic. They also have a finite solubility in pale oil. The higher molecular weight calcium intermediates are soluble in the more viscous lubricating oil fractions, such as bright stock.

The properties of several examples of calcium intermediates prepared from methoxy ethanol are shown in Table II below.

TABLE II.—PROPERTIES OF INTERMEDIATE PREPARED FROM METHYL CELLOSOLVE

| Sample No. | A | B | C | D | E | F |
|---|---|---|---|---|---|---|
| X [1] | 1.07 | 1.21 | 1.28 | 0. | 1.01 | 1.02 |
| Percent Ca [2] | 7.70 | 7.98 | 6.82 | 7.48 | 7.22 | 7.89 |
| Percent CO$_2$ [3] | 9.10 | 9.84 | 9.64 | 0. | 8.00 | 8.87 |
| Viscosity at 100° F. [4] | 16.64 | 26.95 | 18.38 | 4.03 | 8.07 | 9.11 |
| 210° F | 4.56 | 6.26 | 4.06 | 1.31 | 2.41 | 2.30 |
| Specific gravity 60° F. [5] | 1.1180 | 1.1261 | 1.1011 | 1.0546 | 1.0966 | 1.1129 |
| Cold test, ° F. [6] | [7] −50 | [7] −30 | [7] −50 | ([8]) | [7] −90 | [7] −50 |

[1] X is calculated for the following formula:

[2] Determination made by titrimetric procedure using ethylene diamine tetraacetate.
[3] Determination made by acid decomposition and absorption of evolved CO$_2$.
[4] ASTM Method No. D-445.
[5] ASTM Method No. D-1298.
[6] ASTM Method No. D-97.
[7] Fluid.
[8] Pcpt. 75° F.

Figure 2:
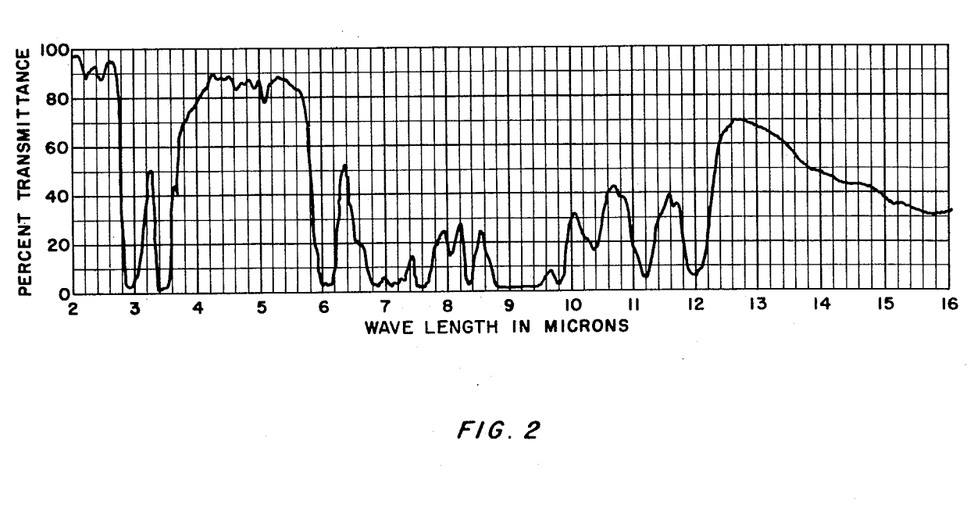

An infrared spectrum of a calcium alkoxide-carbonate complex prepared in accordance with our process is included as FIGURE 2. In this spectrum the band at about 6.08 microns is due to the carbonate structure. The band at about 2.9 microns is due to the hydroxyl group, which is present in the solvent (i.e., methylether of ethylene glycol). The band at about 3.45 microns is due to carbon-hydrogen linkage. The band at about 8.8 microns to about 9.5 microns is due to ether linkage and to alcohol. Both of the latter bands (3.45 microns and 8.8 to 9.5 microns) are due to both the solvent and the calcium intermediate.

All of the base numbers of the products of this invention were determined by the acetic acid titration method which utilizes glacial acetic acid as the solvent and a solution of perchloric acid in glacial acetic acid as the titrant. The method is especially adapted for determination of this type, since equilibria are obtained rapidly. The procedures for carrying out acetic acid titrations are generally outlined in Analytical Chemistry, Volume 23, No. 2, February 1951, page 337, and Volume 24, No. 3, March 1952, page 519. As used herein, base number refers to milligrams of potassium hydroxide per gram of sample.

In order to disclose the nature of the present invention still more clearly, the following illustrative examples will be given in which parts used are parts by weight. In the examples, the numerical value preceding pale oil designates the S.S.U. value at 100° F.

*Example 1.—Preparation of Calcium Isobutoxide Carbonate*

A reaction vessel equipped with 3 reflux condensers was charged with 2,950 parts of methanol, 312.5 parts of calcium carbide, and 2.25 parts of p-toluene sulfonic acid. After 13½ hours at reflux temperature, the reaction appeared complete; and 3,168 parts of material remained in the reaction vessel. The bulk of this material consisted of calcium methoxide slurry and excess methanol. The apparatus was changed and the reaction vessel equipped with a stirrer, a fritted glass tube for $CO_2$ blowing, and a condenser mounted atop three stacked Kjeldahl connecting bulb traps. A charge of 2,000 parts of isobutanol was added, and heating and $CO_2$ blowing were started. Methanol was removed through the condenser, and additional isobutanol was added in 2,000-part increments during the alcohol exchange to maintain at least 3,168 parts of total material in the reaction vessel. A total of 7,120 parts of isobutanol was added during the alcohol exchange. The alcohol exchange was stopped when the overhead temperature reached 104–106° C. Excess isobutanol was removed to a material weight of 3,331 parts. This material was then centrifuged at 1,500 r.p.m. for 2 hours, and the resultant product had a greenish-brown color and was slightly hazy. The product weighed 3,210 parts after centrifugation, but a considerable amount of the loss was due to holdup in the centrifugation equipment. When filtered through Hyflo, the final product was clear and straw colored and analyzed 5.18 percent calcium and 10.15 percent $CO_2$.

The p-toluene sulfonic acid was added as a reaction catalyst to promote carbonation. It was advisable to include this from the beginning, as some preparations have shown a reluctance to carbonate when the catalyst was added after the $CaC_2$ reaction with methanol.

*Example 2*

To a reaction vessel equipped with a stirrer, dropping funnel, thermometer, and reflux condenser were charged 12.6 parts of postdodecylbenzene sulfonic acid, 24.1 parts of 170 pale oil, 28.3 parts of naphtha, 4.8 parts of water (2.5 moles per mole of complex), and 150 parts of benzene. To these constituents, 93.5 parts of calcium isobutoxide carbonate prepared in Example 1 containing 5.18 weight percent of calcium, were added with agitation over an 8-minute period with the flask contents at 52–59° C. The apparatus was then converted for simple distillation, and the preparation was stripped to a flask content temperature of 150° C. $CO_2$ blowing was started and continued for 15 minutes with the flask contents at 140–160° C. The $CO_2$ blowing was used to assist the solvent removal. The 48.8 parts of 26.9 percent active product was bright and fluid. It analyzed 9.93 percent of calcium and had a base number of 252.

*Example 3.—Preparation of Calcium Methoxy Ethoxide*

A reaction vessel equipped with three reflux condensers was charged with 3,600 parts of methoxy ethanol and 600 parts of calcium carbide. Heating was started, and the reaction was maintained at reflux for 3½ hours. Ignoring alcohol weight loss during the $CO_2$ addition, 333 parts of $CO_2$ was added through a fritted tube. After filtering through Hyflo, 3,948 parts of bright reddish-brown solution was obtained. It analyzed 7.22 percent calcium and 7.98 percent $CO_2$. Washing the filter cake and reaction vessel with methoxy ethanol yielded an additional 525 parts of calcium methoxy ethoxide carbonate which analyzed 3.6 percent calcium and 3.03 percent $CO_2$.

*Example 4*

A reaction vessel equipped with a stirrer, dropping funnel, thermometer, and reflux condenser was charged with 12.6 parts of postdodecylbenzene sulfonic acid, 9.9 parts of 170 pale oil, 2.1 parts of water (2.2 moles per mole of complex), and 128.3 parts of naphtha. To these constituents, 83.5 parts of calcium methoxy ethoxide-carbonate prepared in Example 3 (3.16 weight percent calcium) was added with agitation over a 1 to 5-minute period with the flask contents at room temperature. The mixture was heated to reflux and held there for approximately 15 minutes and then cooled to 45° C. and transferred to a separatory funnel. The preparation was further cooled to 26° C. and then $CO_2$ blown for approximately 5 minutes. After standing for 15 minutes, the lower phase was removed; and the 147.4 parts of top phase was beaker stripped to a product temperature of 200° C. The lower phase was composed of mostly methoxy ethanol with smaller amounts of both naphtha and water. The upper phase contained the product, the bulk of the naphtha, and a small amount of methoxy ethanol. The upper phase contained less than 0.1 percent water. The stripped product was $CO_2$ blown while it cooled from 200° C. to 160° C.

The 45.8 percent active product weighed 28.7 parts and was bright and very viscous but pourable. It has a base number of 202.

*Example 5*

A reaction vessel equipped with a stirrer, dropping funnel, thermometer, and reflux condenser was charged with 28.7 parts of sulfonic acid, 34.6 parts of 170 pale oil, 14 parts water (2.2 moles per mole of complex), and 121.7 parts of naphtha. To this mixture was added with agitation 211 parts of calcium methoxy ethoxide carbonate prepared in Example 3 (7.22 weight percent calcium). The addition was completed in less than 10 minutes with the flask contents at room temperature and the intermediate at 75–80° C. The mixture was refluxed for approximately 15 minutes. The apparatus was then changed for simple distillation, and the preparation was stripped to 150–155° C. with $CO_2$ blowing for approximately 15 minutes at that temperature.

99.2 parts of a dark brown bright viscous product having a base number of 364 was obtained.

*Example 6*

To a reaction vessel equipped with a stirrer, thermometer, and reflux condenser were charged 200 parts natural sulfonic acid solution, 57.4 parts of 170 pale oil, and 4.55 parts of calcium hydroxide. The mixture was stirred, heated to reflux, and held there for 1 hour. The preparation was then stripped to 80° C., and 119 parts of benzene was added. The apparatus was then changed for azeotroping, and the water was removed by the benzene water azeotrope which occurs at 69.25° C. The azeotroping procedure was discontinued when the pot temperature reached 84° C., and the overhead temperature reached 83–84° C. The apparatus was then changed for straight refluxing, and 22 parts of benzene and 6.6 parts of water (2.2 moles per mole of complex) were charged to the neutral calcium sulfonate. To the mixture was added 92.7 parts of calcium methoxy ethoxide carbonate (7.22 weight percent calcium) prepared in Example 3 in approximately 2 minutes with the flask contents at 63–65° C. The preparation was refluxed, and the apparatus was then converted for simple distillation. The product was stripped to 150° C. with approximately 15 minutes of $CO_2$ blowing at 145–150° C. The 155.5 parts of product were then filtered through Hyflo.

The resultant product was dark brown, bright, and fluid, possessing a base number of 119.

The natural sulfonic acid solution analyzed as follows:

| | |
|---|---|
| Solvents | MeOH—$H_2O$ |
| Total acidity (meq./gram) | 0.615 |
| Sulfonic acidity (meq./gram) | 0.783 |
| Percent by weight salt ($Na_2SO_4$) | 0.11 |
| Percent by weight of acid oil | 39.6 |
| Percent by weight of water | 23.1 |
| Percent by weight $RSO_3H$ | 33.80 |
| Equivalent weight as acid | 423 |

*Example 7*

To a reaction vessel equipped with a stirrer, thermometer, and reflux condenser were charged 200 parts of natural sulfonic acid solution, 59.8 parts of 170 pale oil, and 5.78 parts of calcium hydroxide. The foregoing constituents were heated, with stirring, to reflux temperature and held there for 1 hour. The neutral calcium sulfonate was filtered through a Hyflo pack and 236.7 parts were recharged to a reaction vessel equipped with stirrer, dropping funnel, thermometer, and reflux condenser; 6.4 parts of water (2.2 moles per mole of complex) and then 90.8 parts of calcium methoxy ethoxide carbonate (7.22 weight percent calcium) prepared in Example 3 was added in approximately 5 minutes with the flask contents at 73–75° C. The mixture was refluxed and the apparatus was converted for simple distillation. The product was stripped to 150° C. with approximately 10 minutes of $CO_2$ blowing at 150° C.

143.3 parts of a dark brown, bright and slightly viscous product was obtained. It had a base number of 120.

The natural sulfonic acid solution used in the example analyzed as follows:

| | |
|---|---|
| Solvent | Water MeOH mixture |
| Total acidity (meq./gram) | 0.777 |
| Sulfonic acidity (meq./gram) | 0.757 |
| Percent by weight of salt $Na_2SO_4$) | 0.24 |
| Percent by weight acid, oil | 37.5 |
| Percent by weight of water | 24.9 |
| Percent by weight of $RSO_3H$ | 33.28 |
| Equivalent weight as acid | 425 |

*Example 8*

To a reaction vessel equipped with a stirrer, thermometer, and reflux condenser were charged 60 parts of a tall oil fatty acid,[1] 81 parts of 100 pale oil, 150 parts of xylene, and 39 parts of water (4 moles per mole of complex). The mixture was then heated to 47° C. and 319 parts of calcium methoxy ethoxide carbonate complex (analyzing 8.03 percent Ca and 8.09 percent $CO_2$) was added over a 20-minute period. The reaction mass was heated to 150° C. to remove volatile components. It was then blown with carbon dioxide for 20 minutes while maintaining the temperature at about 150° C.

The product was stable, very fluid, and contained no nondispersed particles. It had an acetic base number of 332 and contained 11.77 percent Ca by weight.

*Example 9*

To a reaction vessel equipped with a stirrer, thermometer, and reflux condenser were charged 100 parts of a mixture consisting of 57.5 percent (weight) of a phosphorus sulfide-treated polyolefin[1] and 42.5 percent (weight) of 100 pale oil; 75 parts of 100 pale oil, 100 parts of xylene, and 7.65 parts of water (4 moles per mole of complex). The mixture was then heated to 49° C. and 94 parts of calcium methoxy ethoxide-carbonate complex (analyzing 8.03 percent Ca and 8.09 percent $CO_2$) was added over a 25-minute period. The reaction mass was heated to 150° C. to remove volatile components. It was then blown with carbon dioxide for 20 minutes while maintaining the temperature at about 150° C.

The product was clear, stable, and very fluid. It had an acetic base number of 75 and contained 2.8 percent Ca by weight.

*Example 10*

This example illustrates the effect of varying amounts of water on the product produced in accordance with our process.

Four solutions (177.1 total parts) were prepared, each containing:

30.0 parts calcium sulfonate
25.8 parts oil
12.4 parts methoxy ethanol-water azeotrope (containing 15% methoxy ethanol—the water contained herein was equal to 2.2 moles per mole of complex)
108.9 parts naphtha To each of these solutions was added the following quantities of methoxy ethanol-water azeotrope:

A. 11.3 parts (2.0 moles of water per mole of complex)
B. 16.9 parts (3.0 moles of water per mole of complex)
C. 22.6 parts (4.0 moles of water per mole of complex)
D. 28.2 parts (5.0 moles of water per mole of complex)

To each of the preceding solutions there was then added, while stirring, 147.9 parts of calcium methoxy ethoxide-carbonate complex (7.22% Ca), at room temperature over a 10-minute period. The solvents were then removed by heating to 150° C., after which the products were blown with carbon dioxide at 150° C.

The products obtained had the following characteristics:

| | Total water (Moles of water per mole of complex) | Appearance of Product |
|---|---|---|
| A | 4.2 | Bright-somewhat viscous. |
| B | 5.2 | Bright fluid. |
| C | 6.2 | Do. |
| D | 7.2 | Very slightly hazy, slightly more viscous than B and C. |

*Example 11.—Pilot Plant Preparation*

*Intermediate.*—The intermediate used in this example was prepared from methoxy ethanol by a continuous process. The methoxy ethanol solution of the intermediate had the following analysis:

| | |
|---|---|
| Solvent percent | 61.6 |
| Percent Ca (wt.) | 7.98 |
| Percent $CO_2$ | 9.84 |
| Sp. Gr. at 60° F. | 1.1261 |
| Viscosity at: | |
| 100° F., cs. | 26.95 |
| 210° F., cs. | 6.26 |

---

[1] The material used was "Crofatol 5" (from Crosby Chemicals, Inc.), which is a distilled tall oil fatty acid having the following properties:

| | |
|---|---|
| Fatty acids, percent | 90.0 |
| Rosin acid | 6.0 |
| Gardner color | 6–7 |
| Acid number | 190 |
| Saponification value | 192 |
| Unsaponifiables, percent | 4.0 |
| Iodine value | 130 |
| Titre ° C. | 5 |
| Composition of fatty acids present: | |
| Saturated fatty acids, percent | 3 |
| Oleic acid, percent | 51 |
| Linoleic acid, percent | 46 |

[1] This material was prepared by reacting one part of butylene polymer (Indopol H-100, American Oil Co.), having a molecular weight of approximately 780, with 0.157 parts of $P_2S_5$ diluted with 0.875 parts of 100 pale oil. This was followed by steam hydrolysis, contact with Attapulgus clay and filtration. The product consisted of approximately 57.5 percent phosphorus sulfide-treated olefin and 42.5 percent pale oil. It had the following anaylsis:

| | |
|---|---|
| Acidity, (meq./gram) | 0.61 |
| Combining weight (approx.) | 950 |
| Percent phosphorus | 1.85 |
| Percent sulfur | 0.89 |

*Sulfonic acid.*—The postdodecylbenzene sulfonic acid used in this example had the following analysis:

| | |
|---|---|
| Percent solvent (wt.) (special naphtha) | 53.18 |
| Percent acid and non-volatile oil | 46.82 |
| Total acidity, (meq./gram) | 0.558 |
| Sulfonic acidity (meq./gram) | 0.552 |

Charge: Pounds
- Sulfonic acid _____________________ 1,570
- Intermediate _____________________ 2,027
- 100 pale oil _____________________ 222
- Synthetic azetrope [1]
  - Methoxy ethanol _____________ 77
  - Water _______________________ 143

[1] A mixture of 65 percent water and 35 percent methoxy ethanol, roughly approximating tower overhead.

*Procedure.*—The sulfonic acid was added to a 500-gallon Pfaudler reaction vessel, equipped with an overhead condenser. The synthetic azeotrope and intermediate were added concurrently over a period of 50 minutes.

The size of the reaction vessel prevented adding the 100 pale oil until a portion of the solvents was removed. The pale oil was then added and the volatile materials were removed by heating to 310° F. The material was blown with carbon dioxide during final stripping. Stripping and blowing was continued until the product had a flash point of at least 350° F.

*Product.*—A yield of 1,357 pounds of product was obtained, having the following analysis:

| | |
|---|---|
| Base No. | 297 |
| Percent active | 28.9 |
| Percent water (distillate) | 0.08 |
| Specific gravity at 60° F. | 1.126 |

*Example 12.—Series of Pilot Plant Preparations*

*Intermediate.*—Several batches of intermediates were prepared for use in these preparations. The intermediates were prepared from calcium carbide and methoxy ethanol followed by $CO_2$ blowing. The batches had the following analyses:

| Batch No. | Wt. percent Ca | Wt. percent $CO_2$ | Mol ratio $CO_2$/Ca |
|---|---|---|---|
| 1 | 7.90 | 9.06 | 1.04 |
| 2 | 8.12 | 9.69 | 1.08 |
| 3 | 7.49 | 8.98 | 1.09 |
| 4 | 8.03 | 9.54 | 1.08 |
| 5 | 8.00 | 9.09 | 1.03 |
| 6 | 7.56 | 9.39 | 1.13 |
| 7 | 8.01 | 10.40 | 1.18 |
| 8 | 8.04 | 10.32 | 1.17 |
| 9 | 8.08 | 8.82 | 0.99 |
| 10 | 8.10 | 9.36 | 1.08 |
| 11 | 8.24 | 9.60 | 1.06 |
| 12 | 8.23 | 10.32 | 1.11 |

*Sulfonic acid.*—The same batch of postdodecylbenzene sulfonic acid was used in these preparations. It had the following analysis:

| | |
|---|---|
| Weight percent solvent (hexane) | 52.23 |
| Weight percent water | 0.7 |
| Weight percent acid | 47.07 |
| Total acidity (meq./gram) | 0.564 |
| Sulfonic acidity (meq./gram) | 0.564 |
| Combining weight (as Ca) | 467 |

*Procedure.*—The sulfonic acid solution was added to a 600-gallon Pfaudler reaction vessel, equipped with an ovehead condenser and an agitator. Fifteen percent of the water-methoxy ethanol azeotrope was added to the reaction vessel. Seventy-five percent of the diluent oil (100 pale oil) was added to the reaction vessel. An amount of calcium intermediate (calculated to neutralize the sulfonic acid) was added to the reaction vessel. The addition time varied from 15 to 35 minutes, depending on pump condition and amount of foaming. The temperature during addition was about 100° F. The calculated amount of calcium intermediate required for overbasing and the remaining portion (85 percent) of the water-methoxy ethanol azeotrope were added concurrently. The addition time varied from 40 to 55 minutes. The addition temperature was in the range of 90–105° F. The remaining portion (25 percent) of the diluent oil was added after over-basing. The solvents were removed by distillation (3 to 4½ hours), after which the product was blown with $CO_2$ at 300° F. (2 hours) to facilitate volatile solvent removal.

Charge:

| Run No. | 12-A | 12-B | 12-C | 12-D | 12-E |
|---|---|---|---|---|---|
| Sulfonic acid, pounds | 1,700 | 1,700 | 1,700 | 1,700 | 1,700 |
| Azeotrope,[5] pounds | 193 | 182 | 174 | 155 | 193 |
| Intermediate, pounds | [1] 2,272 | [2] 2,327 | [3] 2,205 | [4] 2,230 | [1] 2,272 |
| Diluent oil, pounds | 199 | 199 | 199 | 199 | 199 |
| $H_2O$ used, moles/mole of intermediate | 2.00 | 1.90 | 1.80 | 1.60 | 2.00 |

[1] 252 lbs. of a blend of batches 6 and 7 for neutralization; 2020 lb. batch No. 6 for overbasing.
[2] 228 lbs. of a composite batch for neutralization; 209 lb. batch No. 3 for overbasing.
[3] Batch No. 3.
[4] 240 lbs. of a composite batch for neutralization; 1990 lbs. of batch No. 1 for overbasing.
[5] The azeotrope was a "synthetic" one, prepared by combining water and methoxy ethanol; it contained about 66 percent water.

Products:

| Run No. | 12-A | 12-B | 12-C | 12-D | 12-E |
|---|---|---|---|---|---|
| Activity, wt. percent | 29.1 | 29.5 | 29.8 | 29.8 | 29.5 |
| Acetic base No. | 336 | 315 | 309 | 315 | 329 |
| Calcium, wt. percent | 13.1 | 12.5 | 12.1 | 12.1 | 12.7 |
| $CO_2$, weight percent | 12.6 | 11.9 | 11.9 | 11.7 | 12.3 |
| Molecular weight | 934 | 934 | 934 | 934 | 934 |
| Sp. Gr. at 60° F. | 1.1053 | 1.1516 | 1.1549 | 1.1291 | 1.1125 |
| Viscosity at 210° F., cs | 305.6 | 316.7 | 246.3 | 290.8 | 251.3 |
| $H_2O$, wt. percent | 0.3 | 0.7 | 0.7 | 0.7 | 0.6 |
| COC flash, ° F | 380 | 385 | 410 | 355 | 380 |
| COC fire,[6] ° F | F | 410 | 445 | 395 | F |
| Pour point, ° F | 50 | 55 | 55 | 50 | 55 |
| Yield, lbs | 1,522 | 1,492 | 1,460 | 1,467 | 1,525 |

*Example 13*

This example shows that essentially all of the carbon dioxide present in the intermediate is utilized to form calcium carbonate in the product.

*Procedure.*—A 2-liter, 3-neck flask, equippd with a stirrer, condenser, 2 dropping funnels, thermometer, and heating mantle, was charged with the following materials:

400 parts sulfonic acid solution [1]
86 parts 100 pale oil
11.5 parts methoxy ethanol-water solution (70:30 weight ratio)

The flask contents were heated with stirring to a temperature of 43° C. The following materials were then added concurrently over a one-hour period while agitating and maintaining the temperature at about 43° C.:

585 parts calcium intermediate solution [2]
45.5 parts methoxy ethanol-water solution (70:30 weight ratio)

Following the concurrent addition, the volatile solvents were removed by distillation to a flask temperature of 150° C. At this point, the nearly finished product was divided into two parts. Each of these parts was charged to a one-liter flask equipped with stirrer, thermometer, heating mantle, condenser and gas-blowing frit. One portion was blown with nitrogen gas for 1 hour at 150°

[1] The sulfonic acid solution contained 26.6% (weight) postdodecylbenzene sulfonic acid, 21.4% (weight) 100 pale oil, and 52.0% (weight) hexane. The sulfonic acid had a combining weight of 454.
[2] Calcium intermediate solution contained 7.90% Ca and 9.06% $CO_2$ which corresponds to a $CO_2$:Ca mole ratio of 1.04.

C. The other portion was blown with carbon dioxide gas for 1 hour at 150° C. The two portions were then cooled and samples of each were analyzed. The analyses on these products were as follows:

|  | Percent Ca (wt.) | Percent $CO_2$ (wt.) | $CO_2$/Ca, mole ratio |
| --- | --- | --- | --- |
| $CO_2$ blown product | 11.60 | 11.3 | 0.978 |
| $N_2$ blown product | 11.49 | 10.8 | 0.960 |

Inspection of these data establishes that essentially all of the carbon dioxide present in the intermediate is utilized to form $CaCO_3$ in the finished product. In addition, it is apparent that very little of the $CO_2$ used for gas blowing is utilized and remains in the final product.

Figure 3:
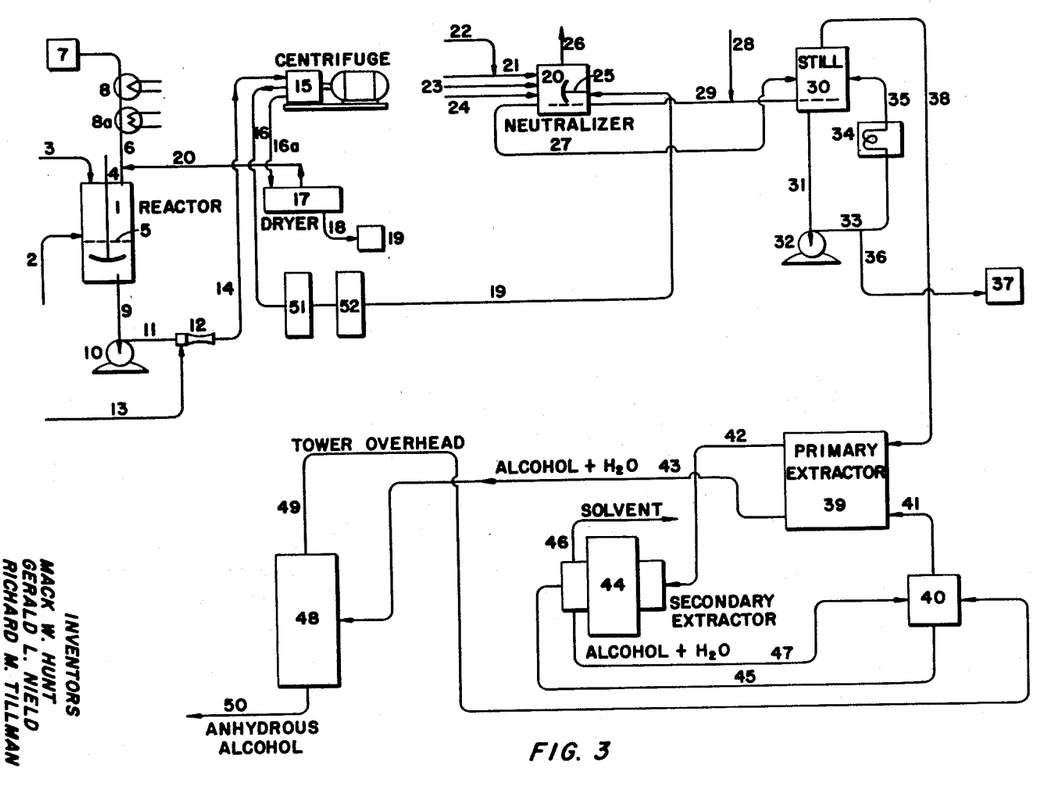

While the preceding examples have shown batch operation of our process, the process is adaptable to continuous operation, or a combination of batch and continuous operation. In order to illustrate the adaptation of our process to commercial operation, a flow diagram of such an operation is shown in the drawing of FIGURE 3. Referring now to FIGURE 3, the following is a description thereof.

The reactor 1 is equipped with agitation means 4 and a screen 5. The calcium carbide enters the reactor 1 through line 3 while the alcohol enters through line 2. The acetylene produced in the reaction leaves the reactor 1 by way of line 6, passing through cooling coils 8 and 8a to the recovery unit 7. The cooling coils 8 and 8a condense the alcohol present in the acetylene with the alcohol returning to reactor 1 by way of line 6. The calcium alkoxide and unreacted calcium carbide (mostly calcium oxide) leave reactor 1 by way of line 9, go through pump 10 and then line 11 to eductor (carbonator) 12. Carbon dioxide is provided to the eductor by line 13. The carbonated calcium alkoxide (calcium alkoxide-carbonate complex) passes from the eductor 12 through line 14 to a centrifuge 15. The centrifuge 15 separates the impurities and unreacted material from the calcium alkoxide-carbonate complex. The impurities and unreacted material go through line 16a to a dryer 17, where the dried impurities and unreacted material pass through line 18 to storage (or are discarded, as desired) 19 and the recovered alcohol goes through line 20 to line 6 and back to reactor 1. The calcium alkoxide-carbonate complex leaves centrifuge 15 by way of line 16 and goes through a cartridge filter 51 to a storage tank 52.

For simplicity, vessel 20 is referred to as a "neutralizer," although overbasing also occurs in this step. The neutralizer 20 is provided with agitation means 25 and a carbon dioxide vent 26. The calcium alkoxide-carbonate complex goes from storage tank 18 through line 19 to the neutralizer 20. The sulfonic acid solution (comprising sulfonic acid, nonvolatile carrier, and hydrocarbon solvent) enters the neutralizer 20 through line 24. Additional nonvolatile carrier (or diluent oil) enters the neutralizer 20 through line 23. Tower overhead, containing about 65 percent water and about 35 percent alcohol, enters the neutralizer 20 through line 21. Additional water for make-up and use in the neutralizer 20 is provided by line 22 which connects to line 21. Carbon dioxide from line 28 goes through line 29 to both the neutralizer 20 and the still 30. The admixture passes from the neutralizer 20 through line 27 to the still 30. An external heat source 34 is used for heating the admixture in the still 30. Recirculation through the heat source 34 and still 30 is provided by lines 31, 33, and 35 and pump 32. Carbon dioxide (or other gas, as desired) is provided from line 28 through 29 to the still. The product goes from line 33 through line 36 to storage 37.

The still overhead, containing water, alcohol, and hydrocarbon solvent, passes from the still 30 through line 38 to a primary extractor 39. Tower overhead from storage tank 40 enters the primary extractor 39 through line 41. The solvent layer, containing some alcohol passes from the primary extractor 39 through line 42 to secondary extractor 44. Tower overhead also enters the secondary extractor through line 45. Hydrocarbon solvent, essentially free of alcohol, leaves the secondary extractor through line 46 and is available for reuse. A mixture of alcohol and water leaves the secondary extractor and goes by way of line 47 to tower overhead storage 40. The alcohol-water layer from the primary extractor 39 goes through line 43 to a fractionating tower 48. Essentially anhydrous alcohol leaves the tower through line 50 and the tower overhead goes through line 49 to tower overhead storage 40.

The following example is provided in order to illustrate our invention in a commercial-size installation. The term "parts" in this particular example refers to pounds per hour. Twelve hundred eighty parts of calcium carbide and 6,517 parts of methoxy ethanol were charged to a reactor. This resulted in a solution comprising 2,965 parts of calcium methoxy ethoxide and 4,147 parts of methoxy ethanol. This solution was then "carbonated" with 686 parts of carbon dioxide. The yield from this carbonation step was 3,650 parts of calcium methoxy ethoxide-carbonate complex and 4,147 parts of methoxy ethanol. In the neutralizing-overbasing step, the following were charged to the reaction vessel:

| | Parts |
| --- | --- |
| Sulfonic acid solution: | |
|   Sulfonic acid | 1,500 |
|   Oil | 1,496 |
|   Hexane | 3,432 |
| Total sulfonic acid | 6,428 |
| Diluent oil | 757 |
| Calcium methoxy ethoxide-carbonate solution (from above) | 7,797 |
| Make-up water * | 260 |
| Tower overhead (water * and methoxy ethanol) | 450 |

* The total amount of water used was equivalent to 2.2 moles per mole of complex.

After completion of reaction, the volatile materials were removed by heating to about 150° C. Two hundred eighty three parts of carbon dioxide were used for "carbonating" and stripping the product. A yield of 5,208 parts of 30 percent active, approximately 300 base number product, was obtained.

The additive agent of the present invention can be used in the range of about 1 to about 20 percent (by weight) in motor lubricating oils, with a preferable range being from about 3 to about 6 percent. When used in marine diesel oils, the suitable range is about 5 to about 25 percent (by weight), with the preferable range being about 10 to about 20 percent. The amount of additive required is dependent on a number of factors, such as intended use, base oil, and amount and type of other additive agents used. The determination of the amount and the development of specific formulations containing the additive agent of our invention is within the skill of those trained in the art.

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

The invention having thus been described, what is claimed and desired to be secured by Letters Patent is:

1. The process of preparing a stable dispersion of a basic, calcium-containing, inorganic compound in a nonvolatile carrier, said inorganic compound being present in the form of particles having a diameter not exceeding about 0.25 micron, said process comprising:

(a) admixing an alcoholic solution of an oil-soluble calcium alkoxide-carbonate complex, an oil-soluble dispersing agent, a nonvolatile carrier, selected from the group consisting of mineral lubricating oils, synthetic lubricating oils, vegetable oils, and animal oils, and water in an amount in excess of the stoichiometric requirement for hydrolysis of said calcium alkoxide-carbonate complex, (b) hydrolyzing the resulting mixture whereby said calcium-containing inorganic compound is formed, and then (c) removing the volatile materials, (d) said process being characterized further in that the calcium alkoxide-carbonate complex of step (a) is prepared by a process comprising:
   (1) reacting a calcium compound, which produces a gas on reaction with an alcohol, with an alcohol, containing not more than 8 carbon atoms and being selected from the group consisting of branched-chain primary alcohols, halogen-containing primary alcohols, monoether alcohols of ethylene glycol and monoether alcohols of diethylene glycol, to form a calcium alkoxide,
   (2) passing carbon dioxide through the calcium alkoxide to form a calcium-alkoxide-carbonate complex, the amount of carbon dioxide employed being from about 0.50 to about 1.50 moles per mole of calcium alkoxide, where a monoether alcohol has been used to prepare said calcium alkoxide, and at least about 1.50 moles per mole of calcium alkoxide, where an alcohol other than a monoether alcohol has been used.

2. The process of claim 1, characterized further in that the oil-soluble dispersing agent is present in the range of about 20 to about 55 percent, the non-volatile carrier in the range of about 34 to about 77 percent, and the calcium-containing inorganic compound in the range of about 4 to about 35 percent of the total composition.

3. The process of claim 2, characterized further in that in step (a) the alcoholic solution of an oil-soluble calcium alkoxide-carbonate complex is added to an admixture comprising an oil-soluble dispersing agent, a nonvolatile carrier selected from the group consisting of mineral lubricating oils, synthetic lubricating oils, vegetable oils, and animal oils, and water in an amount in excess of the stoichiometric requirement for hydrolysis of said calcium alkoxide-carbonate complex.

4. The process of claim 2 wherein the dispersing agent is selected from the group consisting of oil-soluble sulfonic acids, carboxylic acids, phosphorus sulfide treated olefins, and metal salts thereof.

5. The process of claim 4 wherein the dispersing agent is an oil-soluble sulfonic acid and wherein the nonvolatile carrier is a mineral lubricating oil.

6. The process of claim 4 wherein the dispersing agent is an oil-soluble metal sulfonate and wherein the nonvolatile carrier is a mineral lubricating oil.

7. The process of claim 4 wherein the nonvolatile carrier is a mineral lubricating oil.

8. The process of preparing a stable dispersion of a basic, calcium-containing, inorganic compound in a nonvolatile carrier, said inorganic compound being present in the form of particles having a diameter not exceeding about 0.25 micron, said process comprising:
   (a) admixing an alcoholic solution of an oil-soluble calcium alkoxide-carbonate complex, an oil-soluble dispersing agent, a nonvolatile carrier which is a liquid lubricating oil and from about 1.1 to about 7.0 moles of water, with the additional requirement that a stoichiometric excess is present, per mole of said calcium alkoxide-carbonate complex,
   (b) hydrolyzing the resulting mixture whereby said calcium-containing inorganic compound is formed, and then,
   (c) removing the volatile materials,
   (d) said process being further characterized in that the calcium alkoxide-carbonate complex of step (a) is prepared by a process comprising:
      (1) reacting a material, selected from the group consisting of calcium metal, calcium hydride, calcium carbide, with methanol, in the presence of a catalyst selected from the group consisting of benzoyl peroxide, tertiary butylhydroperoxide, phosphorus trichloride, toluene sulfonic acid, postdodecylbenzene sulfonic acid, sulfuric acid, and calcium chloride, to form calcium methoxide,
      (2) transesterifying the calcium methoxide to calcium isobutoxide, and
      (3) passing at least 1.5 moles of carbon dioxide per mole of said calcium isobutoxide through the mixture.

9. The process of claim 8, characterized further in that the oil-soluble dispersing agent is present in the range of about 20 to about 55 percent, the non-volatile carrier in the range of about 34 to about 77 percent, and the calcium-containing inorganic compound in the range of about 4 to about 35 percent of the total composition.

10. The process of claim 9 wherein the dispersing agent is an oil-soluble sulfonic acid.

11. The process of claim 9 wherein the dispersing agent is a metal salt of an oil-soluble sulfonic acid.

12. The process of preparing a stable dispersion of a basic, calcium-containing inorganic compound in a nonvolatile carrier, said inorganic compound being present in the form of particles having a diameter not exceeding about 0.25 micron, said process comprising:
   (a) admixing an alcoholic solution of an oil-soluble calcium alkoxide-carbonate complex, an oil-soluble dispersing agent, a nonvolatile carrier which is a liquid lubricating oil and from about 1.1 to about 7.0 moles of water, with the additional requirement that a stoichiometric excess is present, per mole of said calcium alkoxide-carbonate complex,
   (b) hydrolyzing the resulting mixture whereby said calcium-containing inorganic compound is formed, and then
   (c) removing the volatile materials,
   (d) said process being further characterized in that the calcium alkoxide-carbonate complex of step (a) is prepared by a process comprising:
      (1) reacting a material, selected from the group consisting of calcium metal, calcium hydride, and calcium carbide, with a monoether alcohol of ethylene glycol having from 3 to 8 carbon atoms, to form a calcium alkoxide, and
      (2) passing from about 0.50 to about 1.50 moles of carbon dioxide per mole of said calcium alkoxide through the mixture.

13. The process of claim 12, characterized further in that the oil-soluble dispersing agent is present in the range of about 20 to about 55 percent, the non-volatile carrier in the range of about 34 to about 77 percent, and the calcium-containing inorganic compound in the range of about 4 to about 35 percent of the total composition.

14. The process of claim 13, characterized further in that
   (a) the oil-soluble dispersing agent is selected from the group consisting of oil-soluble sulfonic acids, oil-soluble metal salts of sulfonic acids, oil-soluble carboxylic acids, oil-soluble metal salts of carboxylic acids, oil-soluble phosphorus sulfide-treated olefins, and oil-soluble metal salts of phosphorus sulfide-treated olefins, and
   (b) the amount of water in step (a) is from about 1.6 to about 2.4 moles per mole of calcium alkoxide-carbonate complex.

15. The process of claim 14, characterized further in that in step (a) the alcoholic solution of oil-soluble calcium alkoxide-carbonate complex is added to an admixture comprising an oil-soluble dispersing agent, a liquid lubricating oil, and water.

16. The process of claim 13, wherein calcium carbide and methoxy ethanol are used to prepare the calcium alkoxide-carbonate complex.

17. The process of claim 16 wherein the oil-soluble dispersing agent is an oil-soluble sulfonic acid.

18. The process of claim 16 wherein the oil-soluble dispersing agent is a metal salt of an oil-soluble sulfonic acid.

19. The process of preparing a stable dispersion of a basic, calcium-containing inorganic compound in a liquid lubricating oil, said inorganic compound being present in the form of particles having a diameter not exceeding about 0.25 micron, said process comprising:
(a) admixing an oil-soluble dispersing agent, liquid lubricating oil, calcium methoxy ethoxide-carbonate complex and from about 1.1 to about 7.0 moles of water, with the additional requirement that a stoichiometric excess is present, per mole of said calcium methoxy ethoxide-carbonate complex;
(b) hydrolyzing the resulting mixture whereby said mixture of calcium inorganic compound is formed; and then
(c) removing the volatile materials;
(d) said process being characterized further in that
(1) the calcium methoxy ethoxide-carbonate complex is prepared by reacting calcium carbide with methoxy ethanol to form calcium methoxy ethoxide, followed by passing from about 0.85 to about 1.15 moles of carbon dioxide per mole of said calcium methoxy ethoxide through the reaction mixture,
(2) from 10 to 25 percent of the total amount of water required in step (a) is added to the reaction vessel prior to the addition of any complex and the remaining water and complex are added concurrently, and
(3) the oil-soluble dispersing agent is present in the range of about 20 to about 55 percent, the liquid lubricating oil in the range of about 34 to about 77 percent, and the calcium-containing inorganic compound in the range of about 4 to about 35 percent of the total composition.

20. The process of claim 19, wherein the dispersing agent is an oil-soluble sulfonic acid.

21. The process of claim 19, wherein the dispersing agent is an oil-soluble metal sulfonate.

22. The process of preparing a calcium alkoxide-carbonate complex, said process comprising:
(a) reacting a material, selected from the group consisting of calcium metal, calcium hydride, and calcium carbide, with methyl alcohol in the presence of a catalyst selected from the group consisting of benzoyl peroxide, tertiarybutylhydroperoxide, phosphorus trichloride, toluene sulfonic acid, postdodecylbenzene sulfonic acid, sulfuric acid, and calcium chloride to form calcium methoxide,
(b) transesterifying the calcium methoxide to calcium isobutoxide, and
(c) passing at least about 1.50 moles of carbon dioxide per mole of said calcium isobutoxide through the mixture.

23. The process of claim 22 wherein the calcium compound is calcium carbide.

24. As a new composition of matter, a calcium alkoxidecarbonate complex having the formula:

where R is selected from the group consisting of a $C_1$ to $C_6$ alkyl group and an organic radical of the formula wherein R' is a $C_1$ to $C_4$ alkyl group and wherein $x$ is a number varying from 0.5 to 1.5.

25. As a new composition of matter the calcium alkoxide-carbonate complex of claim 24 wherein R is a methyl group.

26. As a new composition of matter the calcium alkoxide-carbonate complex of claim 24 wherein R is an ethyl group.

References Cited in the file of this patent

UNITED STATES PATENTS

| | | |
|---|---|---|
| 2,671,758 | Vinograd et al. | Mar. 9, 1954 |
| 2,716,087 | Woodruff et al. | Aug. 23, 1955 |
| 2,889,279 | Carlyle et al. | June 2, 1959 |
| 2,920,105 | Kluge et al. | Jan. 5, 1960 |
| 2,931,773 | Thompson et al. | Apr. 5, 1960 |
| 2,956,018 | Carlyle et al. | Oct. 11, 1960 |